US011153578B2

(12) United States Patent
Patel

(10) Patent No.: US 11,153,578 B2
(45) Date of Patent: Oct. 19, 2021

(54) GRADIENT TEXTURING COMPRESSION CODEC

(71) Applicant: ATI Technologies ULC, Markham (CA)

(72) Inventor: Navin Patel, Brampton (CA)

(73) Assignee: ATI Technologies ULC, Markham (CA)

( * ) Notice: Subject to any disclaimer, the term of this patent is extended or adjusted under 35 U.S.C. 154(b) by 339 days.

(21) Appl. No.: 15/965,342

(22) Filed: Apr. 27, 2018

(65) Prior Publication Data

US 2019/0335183 A1 Oct. 31, 2019

(51) Int. Cl.
*H04N 19/186* (2014.01)
*H04N 19/176* (2014.01)

(52) U.S. Cl.
CPC ......... *H04N 19/186* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 5,548,751 A | 8/1996 | Ryu et al. | |
| 5,946,716 A | 8/1999 | Karp et al. | |
| 6,553,457 B1 | 4/2003 | Wilkins et al. | |
| 6,683,979 B1 * | 1/2004 | Walker | G06T 9/005 358/539 |
| 6,728,722 B1 | 4/2004 | Shaylor | |
| 7,068,192 B1 | 6/2006 | Dean et al. | |
| 7,643,679 B2 * | 1/2010 | Iourcha | G06T 15/04 382/166 |
| 7,962,727 B2 | 6/2011 | Frank | |

(Continued)

FOREIGN PATENT DOCUMENTS

| | | |
|---|---|---|
| EP | 1465418 A1 | 10/2004 |
| WO | 2013072889 A1 | 5/2013 |

OTHER PUBLICATIONS

Communication pursuant to Article 94(3) EPC in European Application No. 17159108.4, mailed Oct. 13, 2017, 6 pages.

(Continued)

*Primary Examiner* — Stuart D Bennett
(74) *Attorney, Agent, or Firm* — Rory D. Rankin; Kowert, Hood, Munyon, Rankin & Goetzel, P.C

(57) ABSTRACT

Systems, apparatuses, and methods for performing computation-efficient encoding of video or image frames are disclosed. An encoder partitions a video or image frame into a plurality of sub-frame blocks. For each sub-frame block, the encoder selects a subset of the original pixel values based on one or more criteria. In a first mode, the encoder selects the corners of the sub-frame block. Then, the encoder generates encoding vectors to represent the pixels in between pairs of the selected subset of pixel values. The encoder includes the original pixel values of the selected subset in the encoded block that represents the original sub-frame block. The encoder also includes the encoding vectors in the encoded block, wherein the encoding vectors are calculated based on the color parameter differences between each pair of the selected subset of pixel values. The encoder also includes metadata specifying the encoding mode in the encoded block.

20 Claims, 17 Drawing Sheets

(56) References Cited

U.S. PATENT DOCUMENTS

| | | |
|---|---|---|
| 8,705,635 B2 | 4/2014 | Lee et al. |
| 10,304,155 B2 | 5/2019 | Chan et al. |
| 2007/0274382 A1 | 11/2007 | Hickey et al. |
| 2008/0068231 A1 | 3/2008 | Kuhns |
| 2011/0238914 A1 | 9/2011 | Hirayama |
| 2012/0121013 A1* | 5/2012 | Lainema ............... H04N 19/80 375/240.12 |
| 2014/0098111 A1 | 4/2014 | Ju et al. |
| 2014/0184612 A1 | 7/2014 | Dunaisky et al. |
| 2016/0119621 A1 | 4/2016 | Lin et al. |
| 2018/0020232 A1 | 1/2018 | Saeedi et al. |

OTHER PUBLICATIONS

Kim et al., "Bit-Plane Compression: Transforming Data for Better Compression in Many-core Architectures", Proceedings of the 43rd International Symposium on Computer Architecture, Jun. 18, 2016, pp. 329-340, vol. 44, No. 3.

Communication pursuant to Article 94(3) EPC in European Application No. 17159108.4, mailed Apr. 13, 2018, 8 pages.

Communication pursuant to Article 94(3) EPC in European Application No. 17159108.4, mailed Sep. 19, 2018, 7 pages.

\* cited by examiner

Sub-Frame Block
500

*Assignment of input colors*

A = in[0];
  B = in[3];
  C = in[12];
  D = in[15];

*Encoding Set are then calculated for the following inputs* processColors(A, in[1], in[2], B, encode11, encode12);
processColors(A, in[4], in[8], C, encode13, encode14);

processColors(A, in[5], in[10], D, encode21, encode22);
processColors(B, in[6], in[9 ], C, encode22, encode24);

processColors(B, in[7], in[11], D, encode31, encode32);
processColors(C, in[13], in[14], D, encode33, encode34);

*Save the compressed result* out[0] = operator[0:3];mode[0:3];
out[1] = A[0];
out[2] = A[1];
out[3] = A[2];
out[4] = B[0];
out[5] = B[1];
out[6] = B[2];
out[7] = C[0];
out[8] = C[1];
out[9] = C[2];
out[10] = D[0];
out[11] = D[1];
out[12] = D[2];
out[13] = (encode14 << 6) + (encode13 << 4) + (encode12 << 2) + encode11;
out[14] = (encode24 << 6) + (encode23 << 4) + (encode22 << 2) + encode21;
out[15] = (encode34 << 6) + (encode33 << 4) + (encode32 << 2) + encode31;

```
processColors(C1[], CA[], CB[], C2[], &encode1, &encode2)
{
    Base = C1;

// Direction Vector
    D = C2 - C1;

gradA = {0.0, 0.3, 0.7, 1.0};

//Encode value for CA
    min = 0x1FF;
    for (i = 0 to 3)
    {
        P = Base[i] + (gradA[i] * D[i]);
        diff = abs(CA[i]- P[i])
        if (diff < min)
          {
                encode1 = i;
                min = diff;
          }
    }

// Encode value for CB
    min = 0x1FF;
    for (i = 0 to 3)
    {
        P = Base[i] + (gradA[i] * D[i]);
        diff = abs(CB[i] - P[i])
        if (diff < min)
      {
                encode2 = i;
                min = diff;
      }
    }
}
```

FIG. 9

*Step 1: Obtain the Mode*

Mode = cmp[0] & 0x0F;

*Step 2: Obtain the operator type*

Operator = (cmp[0] & 0xF0) >> 4;

*Step 3: Get the base colors {A, B, C, D} (Ex. RGB 8:8:8)*

A[0] = cmp[1];   // Red channel
   A[1] = cmp[2];   // Green channel
   A[2] = cmp[3];   // Blue channel B[0] = cmp[4];
   B[1] = cmp[5];
   B[2] = cmp[6];

C[0] = cmp[7];
   C[1] = cmp[8];
   C[2] = cmp[9];

D[0] = cmp[10];
   D[1] = cmp[11];
   D[2] = cmp[12];

*Step 4: Get the Encode Sets* encode4[0] = (cmp[13] >> 6) & 0x03;
   encode3[0] = (cmp[13] >> 4) & 0x03;
   encode2[0] = (cmp[13] >> 2) & 0x03;
   encode1[0] = (cmp[13]) & 0x03;

encode4[1] = (cmp[14] >> 6) & 0x03;
   encode3[1] = (cmp[14] >> 4) & 0x03;
   encode2[1] = (cmp[14] >> 2) & 0x03;
   encode1[1] = (cmp[14]) & 0x03;

encode4[2] = (cmp[15] >> 6) & 0x03;
   encode3[2] = (cmp[15] >> 4) & 0x03;
   encode2[2] = (cmp[15] >> 2) & 0x03;
   encode1[2] = (cmp[15]) & 0x03;

Step 5: Perform weighted linear interpolation calculations and map the results

```
processColors(C1[3], outA[3], outB[3], C2[3], encode1, encode2)
{
// Delta from Base Color
    D[0] = C2[0] - C1[0];
    D[1] = C2[1] - C1[1];
    D[2] = C2[2] - C1[2];

// (C1 -> C2)
wLerpA[4] = { 0.0, 0.3, 0.7, 1.0 };

outA[0] = C1[0] + (wLerpA[encode1] * D[0]);
outA[1] = C1[1] + (wLerpA[encode1] * D[1]);
outA[2] = C1[2] + (wLerpA[encode1] * D[2]);
outB[0] = C1[0] + (wLerpA[encode2] * D[0]);
outB[1] = C1[1] + (wLerpA[encode2] * D[1]);
outB[2] = C1[2] + (wLerpA[encode2] * D[2]);
}
```

FIG. 11

GRADIENT TEXTURING COMPRESSION CODEC

BACKGROUND

Description of the Related Art

Various applications benefit from video or image compression which requires less storage space for archived video or image information and/or less bandwidth for the transmission of the video or image information. Accordingly, various techniques (i.e., compression algorithms) to improve the quality and accessibility of digital imagery have being developed. These algorithms are implemented by encoders and decoders, or codecs, to compress video and image data to reduce the amount of data being sent or stored. A decoder then decompresses the encoded data back into the original video or image data, albeit with some loss of data if a lossy algorithm is used.

One commonly used compression algorithm is H.264, which is a video compression standard, or codec, proposed by the Joint Video Team (JVT). The High Efficiency Video Coding (HEVC) is another video compression standard which followed H.264. Also, various texture compression algorithms have been developed to compress textures, images, video frames, or other digital imagery. For example, S3 Texture Compression (S3TC) is a group of lossy texture compression algorithms. S3TC is also referred to as DXTn or DXTC. S3TC is a fixed-rate data compression scheme that is typically used for compressing textures in hardware-accelerated 3D computer graphics. Another set of block compression (BC) formats used for texture compression are a set of seven formats called BC1 through BC7. These formats are used to reduce the memory footprint of texture maps.

Encoders that implement compression algorithms to comply with these various compression standards typically require a large number of computations to perform the encoding process. These computations slow down the operation of the encoder. In certain encoding applications, implementing computation intensive algorithms can be detrimental to performance.

BRIEF DESCRIPTION OF THE DRAWINGS

The advantages of the methods and mechanisms described herein may be better understood by referring to the following description in conjunction with the accompanying drawings, in which:

FIG. 8 illustrates one example of pseudo-code for implementing an encoder.

FIG. 9 illustrates one example of pseudo-code for implementing a processColors function to generate a set of encoding vectors as part of an encoder.

FIG. 10 illustrates one example of pseudo-code of the steps implemented by a decoder to decode a compressed block.

FIG. 11 illustrates a continuation of pseudo-code of the steps implemented by a decoder to decode a compressed block.

DETAILED DESCRIPTION OF IMPLEMENTATIONS

Figure 1:
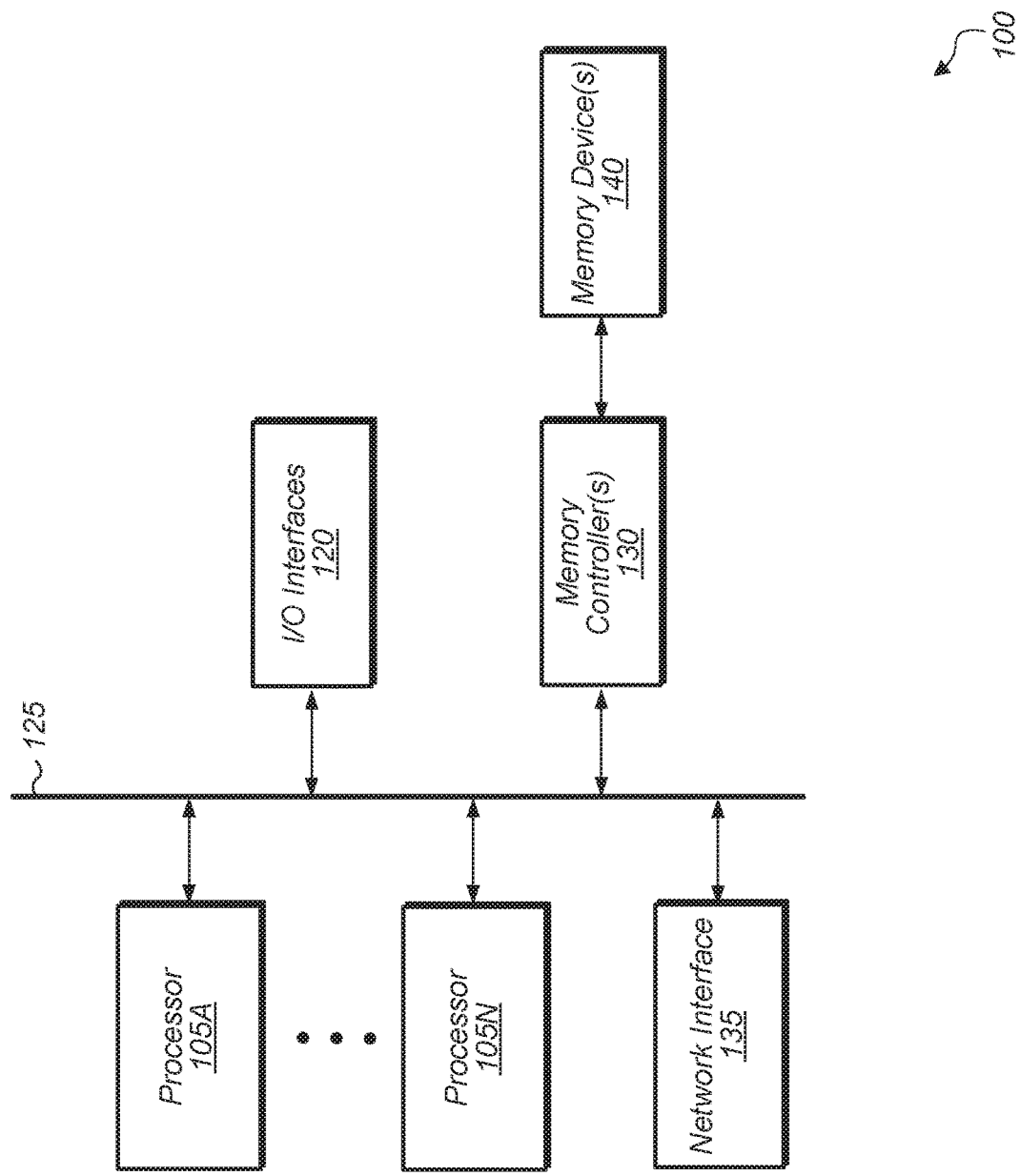
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a gradient texturing encoding scheme are disclosed herein. A system includes circuitry coupled to one or more memories. The circuitry includes logic for implementing an encoder which utilizes a gradient texturing scheme to encode image or video frames. In various implementations, the encoder is implemented using hardware, software, and/or any combination thereof. In implementations where at least a portion of the encoder is implementing using software, program instructions are stored in one or more memories. These program instructions are executable by one or more processors to implement various functions of the encoder.

The encoder receives a video or image frame and then encodes the frame into a compressed form that is reduced in size and that represents the original frame with minimal loss of image quality. The encoder also performs the encoding process in a computation-efficient manner. In one implementation, the encoder partitions a received frame into a plurality of sub-frame blocks. In one implementation, each sub-frame block is 4×4 pixels. However, in other implementations, each sub-frame block has other numbers of pixels. The encoder encodes individual sub-frame blocks of the frame and generates encoded blocks from the sub-frame blocks. The encoder is able to operate in any of various different modes, depending on the implementation. The encoder encodes an indication of the mode within the encoded bitstream being generated.

In one implementation, the encoder selects a subset of pixels from a given sub-frame block of the video frame, with the selection of the subset based on one or more criteria. The encoder includes the original color parameter values of the subset of pixels in an encoded block, wherein the encoded block represents the original, given sub-frame block. It is noted that an "encoded block" is also referred to as a "compressed block" herein. Also, the selected subset of pixels are also referred to herein as a "set of end-point pixels". The encoder does not include the other pixels of the sub-frame block in the encoded block. The encoder calculates encoding vectors between pairs of the selected subset of pixels, wherein the encoding vectors include weighted linear interpolation values. The encoding vectors will be used by the decoder to reconstruct the missing pixels from the block by applying the weighted linear interpolation values to the differences of the color parameter values between the pairs of the selected subset of pixels. Then, the encoder includes the encoding vectors in the encoded block. The encoder also includes metadata in the encoded block, wherein the metadata indicates the mode of the encoder. Then, the encoder follows this pattern of operations for the other sub-frame blocks of the frame being encoded.

In one implementation, the encoder selects the corners of the sub-frame block as the subset of pixels to include in the encoded block representing the sub-frame block. In another implementation, if a given pair of the corners of the sub-frame block have the same color parameter values, then the encoder selects other pixels from the sub-frame block which have different color parameter values. Also, in this implementation, the encoder generates an indication which identifies the selected pixels. The encoder embeds this indication in the metadata in the encoded block. In various implementations, encoders using the above techniques for encoding sub-frame blocks are able to perform the encoding process much faster (i.e., with fewer computations) than encoders which use existing encoding algorithms. This helps to improve encoder performance and enables encoders to be used in a wider variety of performance-intensive applications.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, and memory device(s) 140. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, one or more of processors 105A-N implements an encoder to encode sub-frame blocks of an image or video frame. In various implementations, the encoded blocks generated by the encoder are stored in memory device(s) 140, conveyed to a separate module for network transmission, processed by a separate module, sent to a decoder, and/or provided to other types of modules which perform other types of operations.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device (s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
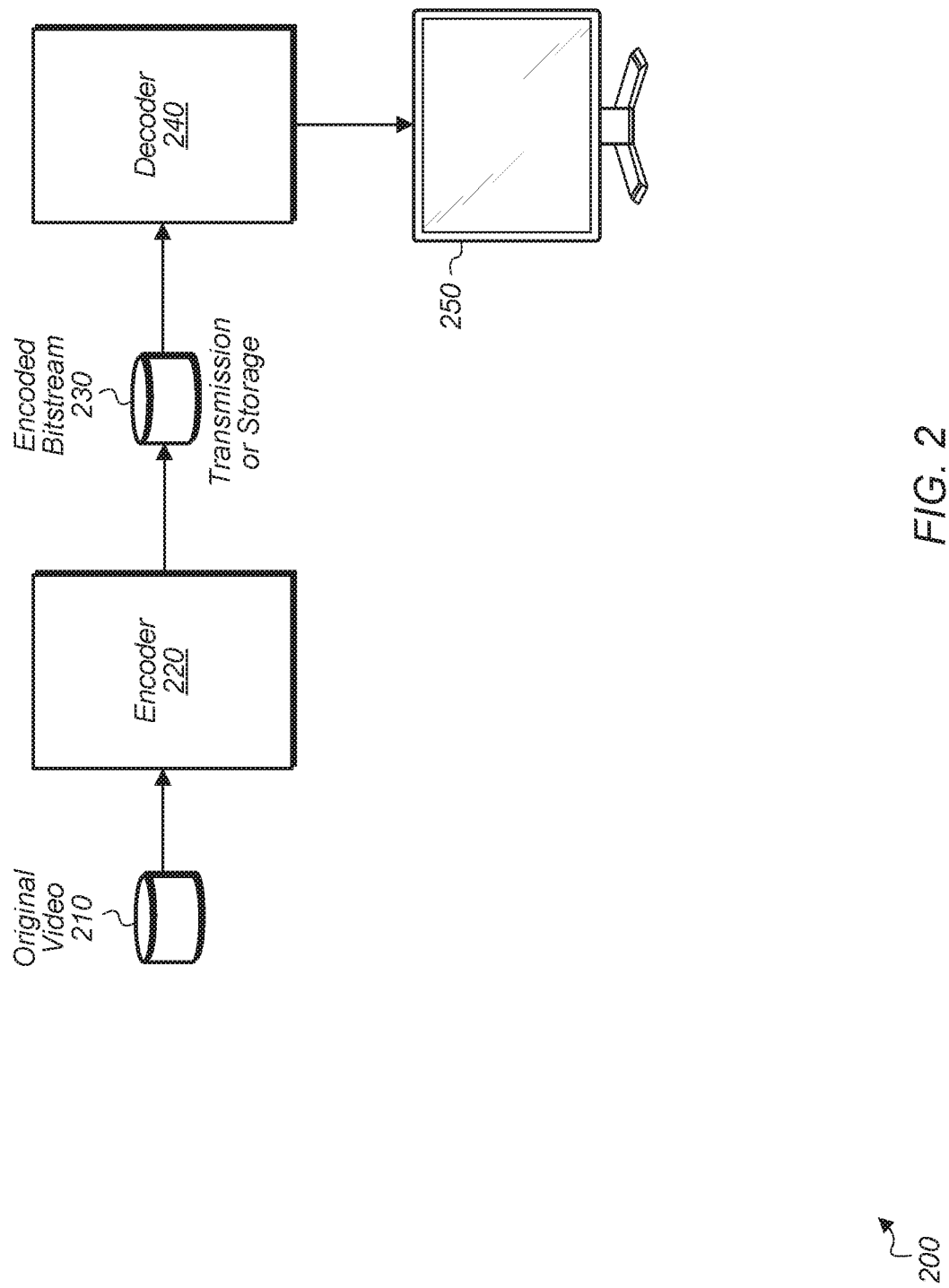
FIG. 2 is a block diagram of one implementation of a computing system for encoding and decoding a video stream.

Turning now to FIG. 2, a block diagram of one implementation of a system 200 for encoding and decoding a video stream is shown. In one implementation, encoder 220 and decoder 240 are part of the same system 200. In another implementation, encoder 220 and decoder 240 are part of separate systems. In one implementation, encoder 220 includes circuitry to compress original video 210 into encoded bitstream 230. Decoder 240 includes circuitry to decode encoded bitstream 230 and then drive the decoded bitstream to display 250. In another implementation, encoder 220 compresses an image frame rather than a video stream and decoder 240 decodes and drives the image frame to display 250.

In one implementation, the pixels of the frames of original video 210 include three color channels. For example, in one implementation, the pixels of the frames of original video 210 are encoded in the red-green-blue (RGB) color space. In other implementations, the pixels of the frames of original video 210 are stored in other formats (e.g., YCbCr, YUV, ARGB) and/or with other numbers of color component channels.

Depending on the implementation, encoder 220 and decoder 240 are each implemented using any suitable combination of hardware and/or software. For example, encoder 220 is implemented in a computing system that includes a central processing unit (CPU), graphics processing unit (GPU), digital signal processor (DSP), field programmable gate array (FPGA), application specific integrated circuit (ASIC), or any other suitable hardware devices. In some cases, the hardware device(s) are coupled to one or more memory devices which include program instructions executable by the hardware device(s). Similarly, decoder 240 is implemented using any combination of hardware and/or software.

In one implementation, encoder 220 partitions each video frame of original video 210 into a plurality of N×N blocks. Then, for each block, encoder 220 selects M pixels from the block and includes the existing color component values of these M pixels in an encoded block which represents the original block. It is noted that N and M are positive integers. In one implementation, N is 4 and M is 4. However, in other implementations, N and M are any of various other values. In one implementation, the existing color component values of these M selected pixels are stored in the encoded block without being modified. In other words, no computations are performed on the existing color component values and these existing color component values are stored in their original state. In another implementation, the existing color component values of these M selected pixels are truncated to reduce the number of bits per color component value. For example, one or more of the lowest bits of the color component values are dropped to reduce the number of bits per color component value.

In one implementation, encoder 220 calculates encoding vectors which represent weighted values to apply to color component gradients between pairs of the M selected pixels. Encoder 220 includes these calculated encoding vectors in the encoded block which represents the original block. The encoding vectors are used by decoder 240 to derive the missing pixel values which were not included in the encoded block. Additionally, encoder 220 includes an indication of the mode in the encoded block. In one implementation, the size of the mode indication is 4 bits. In this implementation, encoder 220 operates in one of sixteen modes. In other implementations, the mode indication is represented using other numbers of bits.

Figure 3:
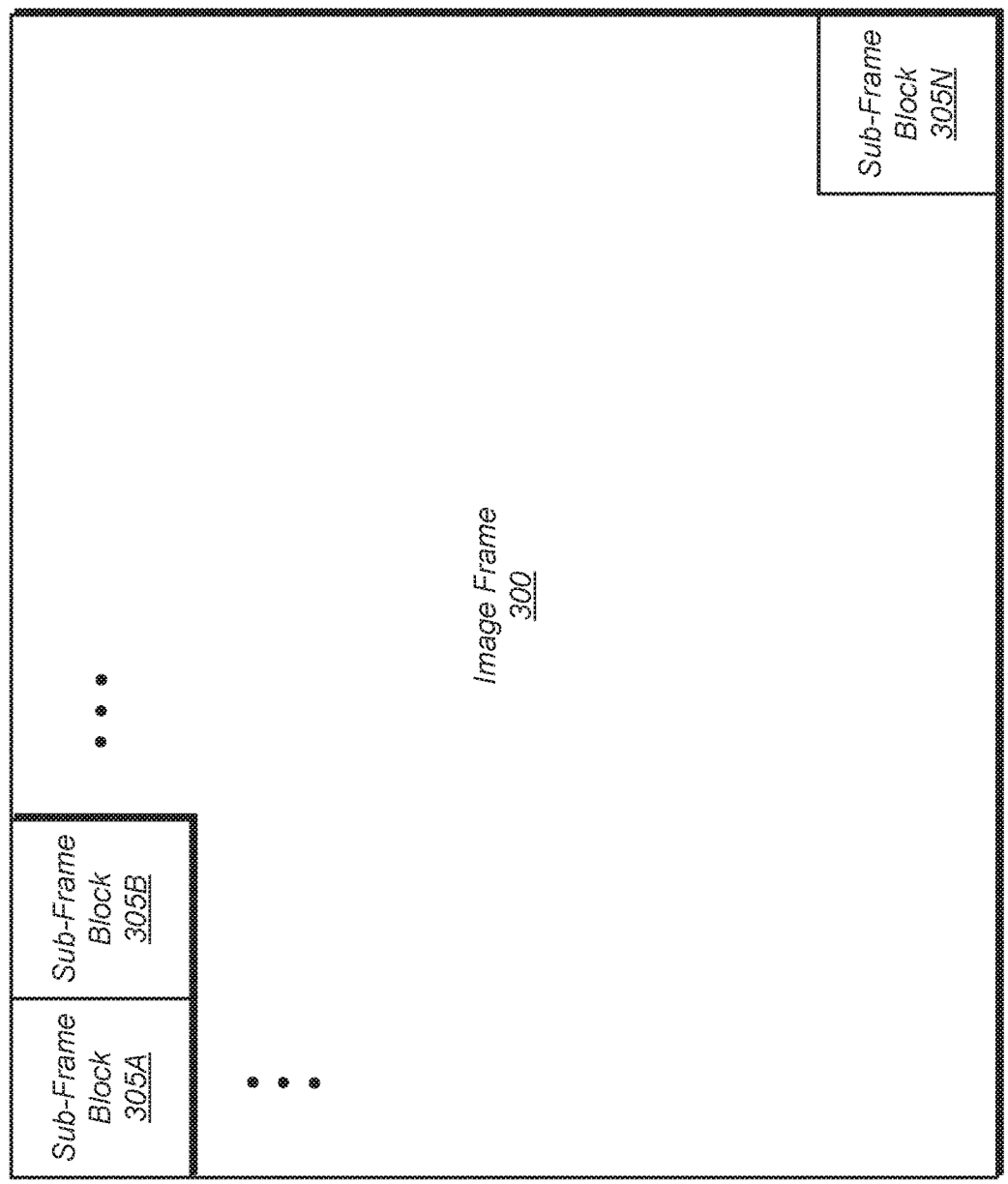
FIG. 3 is a block diagram of one implementation of an image frame partitioned into a plurality of sub-frame blocks.

Referring now to FIG. 3, a block diagram of one implementation of an image frame 300 partitioned into a plurality of sub-frame blocks 305A-N. In one implementation, an encoder (e.g., encoder 220 of FIG. 2) receives image frame 300 and a request to encode image frame 300. It is noted that image frame 300 is also representative of an individual video frame of a video sequence. Also, throughout this disclosure, when an image frame is presented or described, it should be understood that the discussion regarding the image frame is also applicable to a video frame, and vice versa.

In one implementation, the encoder partitions image frame 300 into a plurality of sub-frame blocks 305A-N. In another implementation, image frame 300 is already partitioned into sub-frame blocks 305A-N prior to being conveyed to the encoder. The size (i.e., number of pixels) of each sub-frame block varies according to the implementation. In one implementation, each sub-frame block 305A-N is 4 pixels by 4 pixels. In other implementations, each frame-block 305A-N is any of various other sizes. The total number of sub-frame blocks 305A-N within image frame 300 varies based on the size of image frame 300 and the size of each sub-frame block 305A-N. In one implementation, the encoder encodes image frame 300 by encoding the individual sub-frame blocks 305A-N. In one implementation, the encoder generates a separate encoded block for each original sub-frame block 305A-N. These encoded blocks are then stored and/or conveyed to a separate module which stores, decodes, and/or displays image frame 300.

Figure 4:
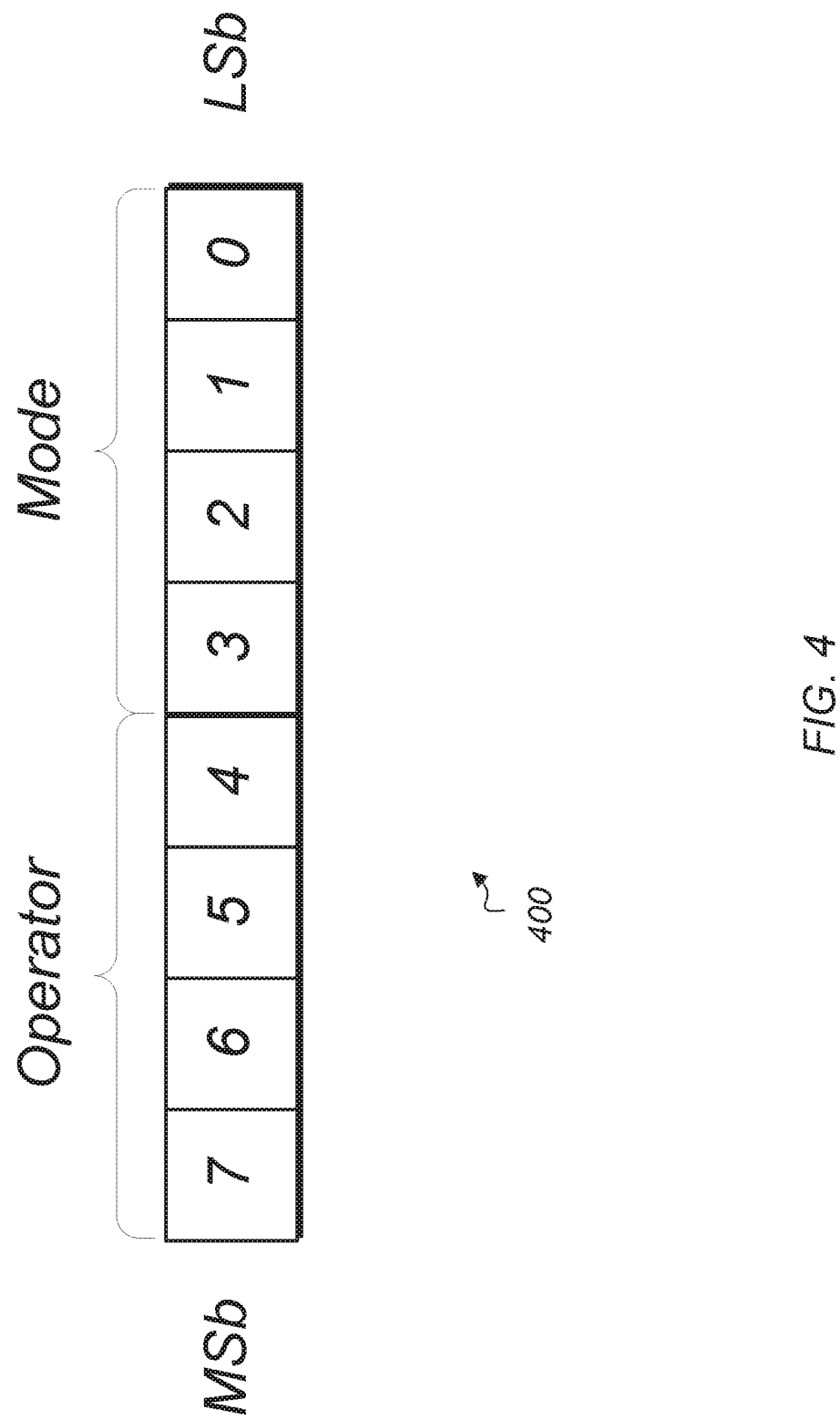
FIG. 4 is a block diagram of one implementation of an operator mode indicator.

Turning now to FIG. 4, a diagram of one implementation of an operator mode indicator 400 is shown. In one implementation, the initial portion of data in a compressed block is an operator mode indicator 400. In this implementation, for each compressed block generated by an encoder from an original uncompressed block of pixels, the encoder generates an operator mode indicator 400 and includes the operator mode indicator 400 as the first portion of the data in the compressed block (e.g., the most significant bits, MSb). In other embodiments, the operator mode indicator 400 may be stored elsewhere (e.g., the least significant bits, LSb, or otherwise) within the compressed block.

In one implementation, operator mode indicator 400 is one byte in size. In other implementations, operator mode indicator 400 is other sizes. In the implementation shown in FIG. 4, the first four bits of operator mode indicator 400 select the operator value (i.e., operator setting) and the second four bits select the mode value (i.e., mode setting). The operator value determines the type of calculations and data packing that are performed on end-point pixel pairs. For example, in one implementation, if the operator value is equal to 0, then a weighted linear interpolation operation is applied to a pair of pixel end-points to calculate two new pixels in between the pair of pixel end-points. In this implementation, if the operator value is non-zero, then the encoder uses other types of algorithms to encode the original block of pixels. The types of other algorithms that are employed vary from implementation to implementation. The mode bits determine how resulting output pixels are generated. For example, in one implementation, the mode bits indicate how the color parameter values will be patterned.

Figure 5:
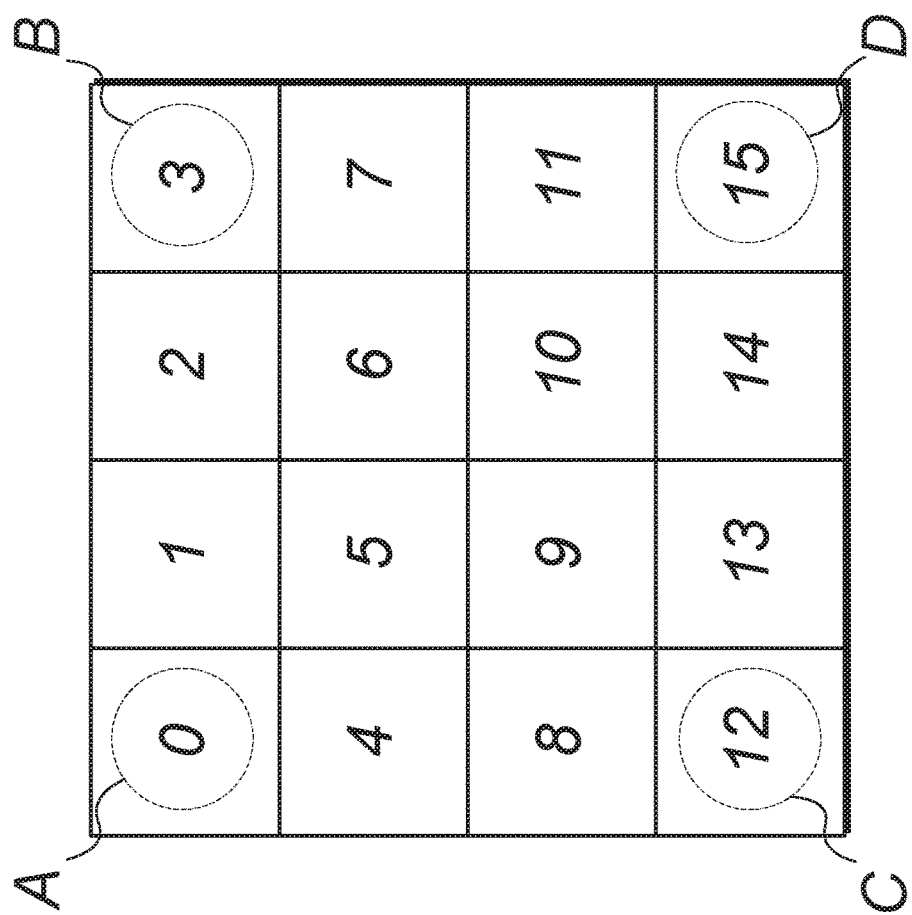
FIG. 5 is a diagram of one implementation of a sub-frame block.

For the purposes of this discussion, it is assumed that the operator mode indicator 400 applies to the pixels of sub-frame block 500 (of FIG. 5). The color component values of pixel coordinates A-D in sub-frame block 500 have size ranges from 2 to n bytes, wherein "n" is the number of color channels and is determined by the operator value of operator mode indicator 400. The color component values of pixel coordinates A-D are the original color component values of these pixels in the source sub-frame block 500. In one implementation, the positions of the set of end-point pixels in the encoded block are determined by the mode value. Also, in this implementation, the number of bits used to represent the color channels and the packing of the pixel channels varies according to the operator value and according to the implementation.

In one implementation, the encoder generates three encoding vectors (Encode1, Encode2, and Encode3) for an encoded block based on the sub-frame block 500. These three encoding vectors are also referred to as an "encoding set". In one implementation, the size of each encoding vector ranges from 1 to m bytes, where "m" is determined by the operator value. Encoding sets are used to determine the type of operation that is to be performed using a pair of colors in the set {A, B, C, D}. Each encoding vector is sub-divided into multiple parts, and each part is used to encode a pair of pixels found between two end-point pixels. The choice of the two end-point pixels is determined by the mode value. Each encoding set operates on the color components of one pair of end-point pixels, for a total of 6 operations for an encoding set per output block.

Referring now to FIG. 5, a diagram of one implementation of a sub-frame block "cmp" 500 is shown. In one implementation, sub-frame block 500 is 4×4 pixels. In other implementations, sub-frame block 500 has other numbers of pixels. As shown, the pixels of sub-frame block 500 are labeled from 0-15. In one implementation, each pixel has 3 color component channels and each channel has 8 bits. In one implementation, an encoder (e.g., encoder 220 of FIG. 2) generates a compressed block from sub-frame block 500, and the compressed block is 128 bits (or 16 bytes) in size. In other implementations, the size of the compressed block varies.

In one implementation, the input pixels are in the red-green-blue (RGB) format, and each pixel includes 3 bytes, with one byte per color component. The input pixels of sub-frame block 500 are referred to herein as in[0] to in[15]. The encoder selects a set of end-point pixels from sub-frame block 500 and then includes the color component values from this selected set in the compressed block representing sub-frame block 500. In one implementation, the corner pixels are selected from sub-frame block 500. In one implementation, selecting the corner pixels as the set of end-point pixels is referred to as mode 0. In other implementations, other pixels from sub-frame block 500 are selected as the set of end-point pixels.

The encoder is able to operate in any of various different modes, with an indication of the mode being encoded in the compressed block. In one implementation, the encoder is able to operate in one of 16 different modes, with a 4-bit indication used to specify the mode. In other implementations, the encoder operates in other numbers of different modes. As shown in FIG. 5, the corner pixels (labeled A, B, C, and D) are selected from sub-frame block 500 as the set of end-point pixels, and these corner pixels are the starting end-point pixels for subsequent calculations. As used herein, the term "end-point pixel" refers to a pixel which is included within the compressed block which represents the original sub-frame block 500. When the corner pixels are selected as the set of end-point pixels, the first encoding vector (i.e., encoder 1) uses input pixels (A, 1, 2, B) and (A, 4, 8, C), the second encoding vector (i.e., encoder 2) uses input pixels (A, 5, 10, D) and (B, 6, 9, C), and the third encoding vector (i.e., encoder 3) uses input pixels (B, 7, 11, D) and (C, 13, 14, D).

In other implementations, and in other modes, the selection of the set of end-point pixels varies according to the color components of the source data. The other pixels of original sub-frame block 500 are dropped from the compressed block. In one implementation, the set of end-point pixels are selected from the edges of the sub-frame block. In other implementations, the set of end-point pixels are selected from any pixels within sub-frame block 500, with end-point pixels potentially selected from the interior pixels (i.e., pixels 5, 6, 9, 10) of sub-frame block 500.

In various implementations, the encoder generates a compressed block from sub-frame block 500. In one implementation, the compressed block is an array of 16 bytes. In other implementations, the compressed block generated by the encoder has other sizes and/or is organized differently. In one implementation, when a decoder (e.g., decoder 240 of FIG. 2) decompresses the compressed block, the size of each output pixel is equal to 3 bytes. In other implementations, the size of the decompressed output data varies.

Figure 6:
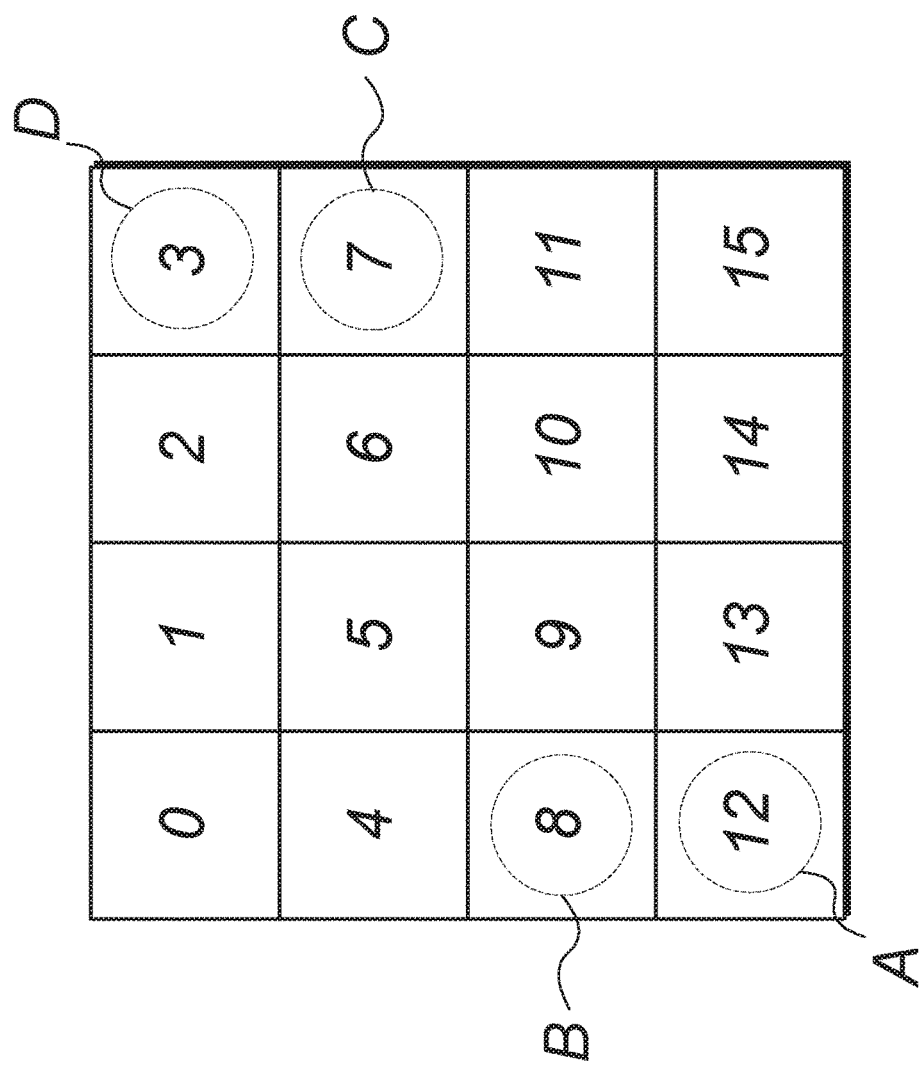
FIG. 6 is a diagram of another implementation of a sub-frame block with a different selection of end-point pixels.

Turning now to FIG. 6, a diagram of another implementation of a sub-frame block 600 with a different selection of end-point pixels is shown. When the encoder selects a set of end-points from a given sub-frame block 600, the encoder is able to select from pixels other than the corners of sub-frame block 600. In one implementation, the encoder uses a pattern recognition technique to determine which set of end-points to select from sub-frame block 600. In other implementations, the encoder uses other suitable techniques for determining which set of end-points to select from sub-frame block 600.

For example, in one implementation, if the encoder detects that an adjacent pair of corner pixels have the same color coordinate values, then the encoder selects the end-point pixels from other pixels in the sub-frame block 600 which have different color parameter values. Alternatively, if the encoder detects that the difference between the color coordinate values of an adjacent pair of corner pixels is less than a threshold, then the encoder selects the end-point pixels from other pixels in the sub-frame block 600 which have greater color coordinate value differences. In one implementation, the encoder selects a given set of end-point pixels which have the greatest difference between their respective color parameter values. After the encoder selects the end-point pixels from sub-frame block 600, the encoder encodes an indication of this selected set of end-point pixels and embeds the indication in the compressed block.

For example, as shown in FIG. 6, the selected end-point pixels from sub-frame block 600 are original pixels 12 (assigned to the coordinate A), 8 (assigned to the coordinate B), 7 (assigned to the coordinate C), and 3 (assigned to the coordinate D). In one implementation, this assignment of original pixels of sub-frame block to the different end-point pixel coordinates is designated as mode 1. For this assignment of original pixels of sub-frame block to the different end-point pixel coordinates, the first encoding vector uses input pixels (A, 13, 2, B) and (A, 9, 6, C), the second encoding vector uses input pixels (A, 14, 15, D) and (B, 10, 11, C), and the third encoding vector uses input pixels (A, 0, 1, D) and (B, 4, 5, C).

Figure 7:
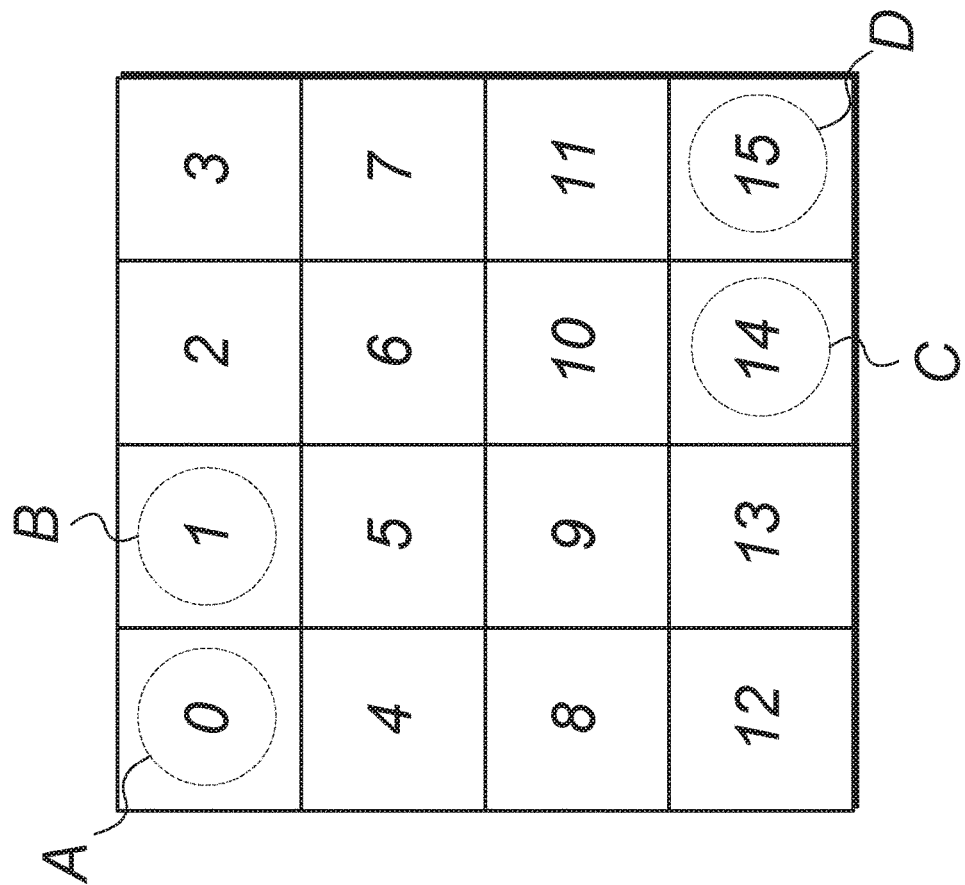
FIG. 7 is a diagram of another implementation of a sub-frame block with an alternate selection of end-point pixels.

Referring now to FIG. 7, another example of a different set of end-point pixels being selected from sub-frame block 700 is shown. In the example of sub-frame block 700, the pixels that are selected as the set of end-point pixels for sub-frame block 700 are shown with the dashed circles and labels for their corresponding end-point pixel coordinates. Specifically, pixel 0 is selected as end-point pixel coordinate A, pixel 1 is selected as end-point pixel coordinate B, pixel 14 is selected as end-point pixel coordinate C, and pixel 15 is selected as end-point pixel coordinate D. It is noted that only coordinates B and C have changed from the assignment of corner pixels as the set of end-point pixel coordinates which corresponds to mode 0. The assignment of original pixels to end-point pixel coordinates shown in sub-frame block 700 is referred to as mode 2 in one implementation. In the example shown in sub-frame block 700, the first encoding vector uses input pixels (A, 4, 11, D) and (B, 5, 10, C), the second encoding vector uses input pixels (A, 8, 12, D) and (B, 9, 13, C), and the third encoding vector uses input pixels (A, 3, 7, D) and (B, 2, 6, C).

Turning now to FIG. 8, one implementation of pseudo-code 800 for implementing an encoder is shown. In one implementation, the instructions of pseudo-code 800 are executed by one or more processors to implement encoder 220 (of FIG. 2). In one implementation, pseudo-code 800 begins by assigning input colors to the end-point pixel coordinates. In the example shown in pseudo-code 800, the end-point pixel coordinate A is assigned to input pixel 0 (or in[0]), the end-point pixel coordinate B is assigned to input pixel 3 (or in[3]), the end-point pixel coordinate C is assigned to input pixel 12 (or in[12]), and the end-point pixel coordinate D is assigned to input pixel 15 (or in[15]). This corresponds to selecting the corner pixels of the sub-frame block as the set of end-point pixels as shown in sub-frame block 500 (of FIG. 5). This selection is also referred to herein as mode 0. It should be understood that this selection of the set of end-point pixels is merely indicative of one implementation. In other implementations, other pixels from the sub-frame block are selected as the set of end-point pixels.

Next, the set of encoding vectors are calculated using a function referred to as "processColors". One example of pseudo-code for implementing the function "processColors" is shown in FIG. 9. Twelve different encoding vectors (encode 11, encode 12, encode 13, encode 14, encode 21, encode 22, encode 23, encode 24, encode 31, encode 32, encode 33, encode 34) are calculated using the end-point pixels and other pixels from the original sub-frame block. Then, the encoder saves the compressed result as indicated by the array out[0:15]. As shown, the first element of array out[ ] stores the operator and mode values, the second through thirteenth elements of array out[ ] store the color parameter values of the selected set of end-point pixels, and then the fourteenth through sixteenth elements of array out[ ] store the set of encoding vectors. It should be understood that pseudo-code 800 is merely one example of software instructions for implementing an encoder. In other implementations, other ways of implementing the encoder with other numbers and types of software instructions are possible and are contemplated.

Referring now to FIG. 9, one example of pseudo-code 900 for implementing a processColors function to generate a set of encoding vectors as part of an encoder is shown. In one implementation, the processColors function shown in pseudo-code is invoked by an encoder executing instructions represented by pseudo-code 800 (of FIG. 8).

In one implementation, pseudo-code 900 begins by setting the variable "Base" equal to the color parameter values of the first end-point pixel "C1". Then, a direction vector "D" is set equal to the difference between the pair of end-point pixels "C2" and "C1". Also, a gradient vector "gradA" is initialized to the values {0.0, 0.3, 0.7, 1.0}. It is noted that the values used to initialize "gradA" are allowed to vary from implementation to implementation. Then, pseudo-code 900 includes instructions for generating values for encoding vectors (encode1 and encode2) which are used to encode the values of discarded pixels "CA" and "CB". Essentially, pseudo-code maps the values of discarded pixels "CA" and "CB" to an index value from the gradient vector "gradA", with the index value being the closest approximation to the discarded pixel. The values for encoding vectors (encode1 and encode2) are then stored in the compressed block which is generated to represent the original sub-frame block. It should be understood that pseudo-code 900 is merely one example of software instructions for executing a processColors function to generate a set of encoding vectors. In other implementations, other ways of generating a set of encoding vectors with other numbers and types of software instructions are possible and are contemplated.

Turning now to FIG. 10, one example of pseudo-code 1000A of the steps implemented by a decoder to decode a compressed block are shown. It is noted that the steps 1-4 shown in pseudo-code 1000A are merely indicative of one implementation. Other steps are implemented by a decoder to decode a compressed block in other implementations.

In step 1, the decoder obtains the mode type from a first portion of the first byte of the compressed block. In this example, the first byte is indicated as cmp[0] and the lower four bits of the byte are selected using the mask 0x0F. In step 2, the decoder obtains the operator type from the other half of the first byte of the compressed block, with the four selected bits being shifted to the lower part of the result. In other implementations, the mode type and/or operator type are stored in other locations within the compressed block. The number of bits used to represent the mode type and/or operator type also varies according to the implementation.

In step 3, the decoder retrieves the base colors of the set of end-point pixels (A, B, C, D). In one implementation, these color parameters are stored in bytes 1-12 of the compressed block. In the example shown in pseudo-code 700A, it is assumed that there are 3 color channels (red, green, and blue). In other implementations, other numbers and/or types of pixel component channels are used. In step 4, the decoder retrieves the encoding vector sets from the compressed block. In one implementation, the encoding vector sets are stored in bytes 13-15 of the compressed block. In other implementations, the encoding vector sets are stored in other locations and/or include other numbers of bits.

Referring now to FIG. 11, a continuation of an example of the pseudo-code 1000B for a decoder to decode a compressed block is shown. Pseudo-code 1000B is intended to be a continuation of the steps shown in pseudo-code 1000A for a decoder to decode a compressed block. As shown in pseudo-code 1000B, step 5 of implementing the decoder involves performing weighted linear interpolation calculations and then mapping the results to regenerate the missing pixel values from the original block. The example values in the weighted linear interpolation (wLerpA) array are merely indicative of one implementation. It is noted that the example values in the weighted linear interpolation (wLerpA) array match the values of the "gradA" vector in pseudo-code 900 (of FIG. 9) which is used in one implementation by the encoder to generate the compressed block being decoded. In other implementations, other values are utilized in the wLerpA array.

The missing pixel values are generated based on the end-point pixels (A, B, C, D) using the encoding vector sets and based on the weighted linear interpolation (wLerpA) array. Example calculations are shown in pseudo-code 1000B for calculating the missing pixel values. These calculations are indicative of one particular implementation. In other implementations, other types of calculations for generating the missing pixel values are possible and are contemplated.

Figure 12:
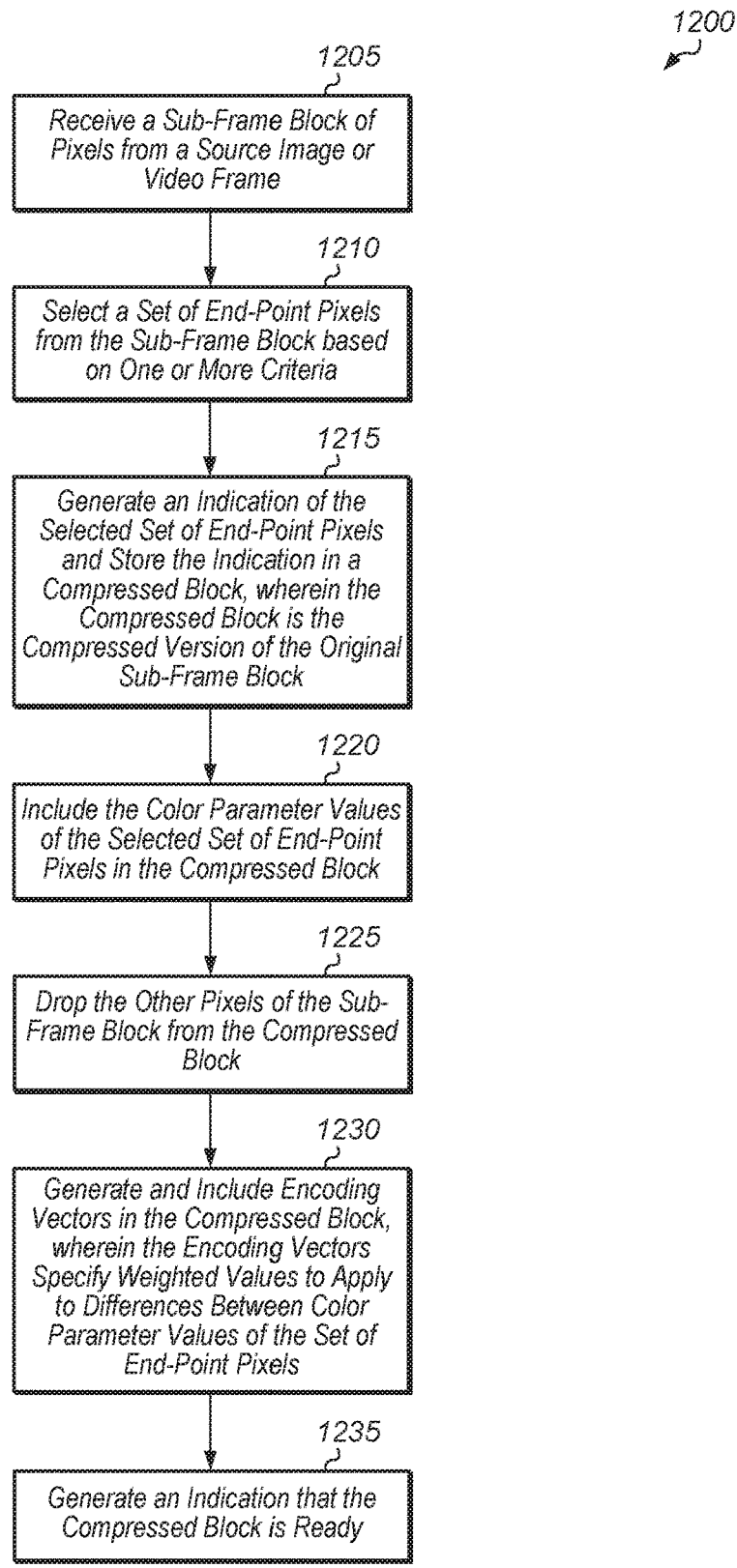
FIG. 12 is a generalized flow diagram illustrating one implementation of a method for encoding a sub-frame block of pixels.
Figure 13:
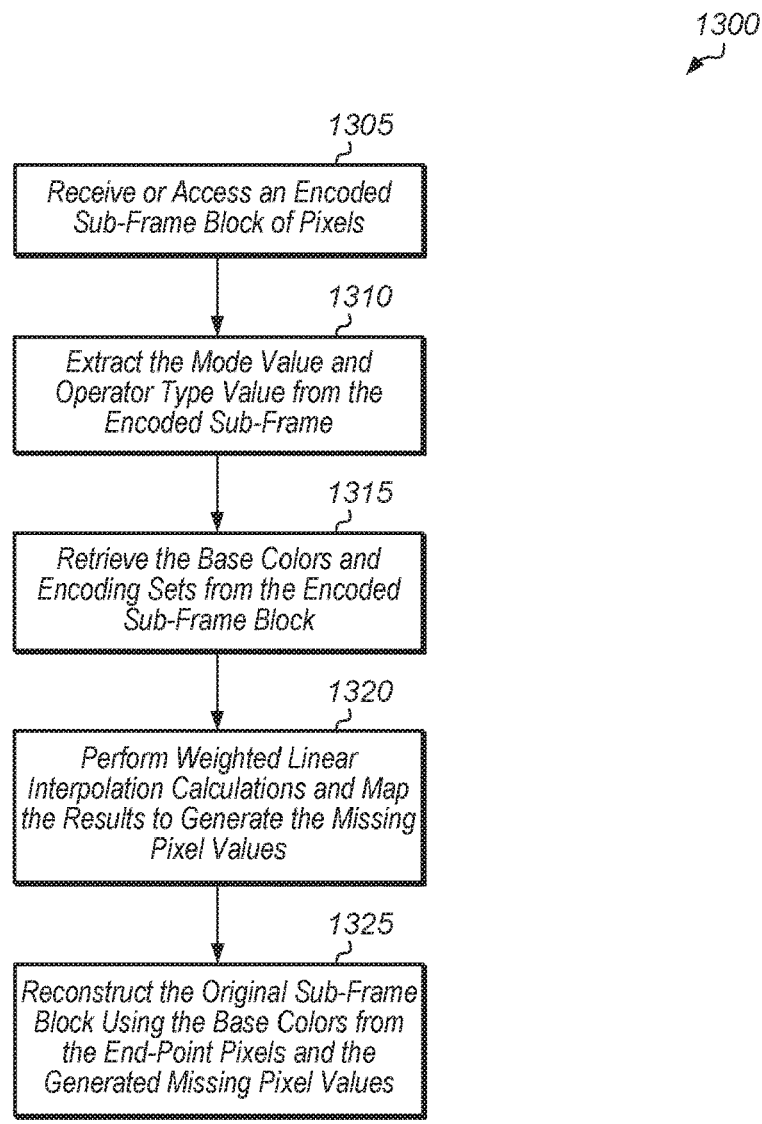
FIG. 13 is a generalized flow diagram illustrating one implementation of a method for decoding an encoded sub-frame block of pixels.
Figure 14:
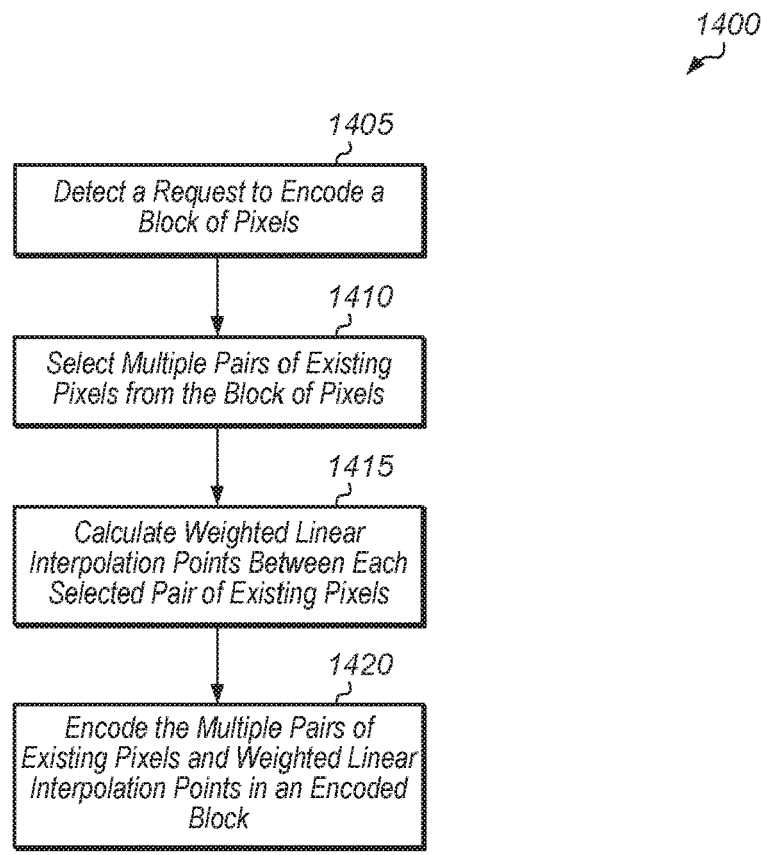
FIG. 14 is a generalized flow diagram illustrating one implementation of a method for encoding a block of pixels.
Figure 15:
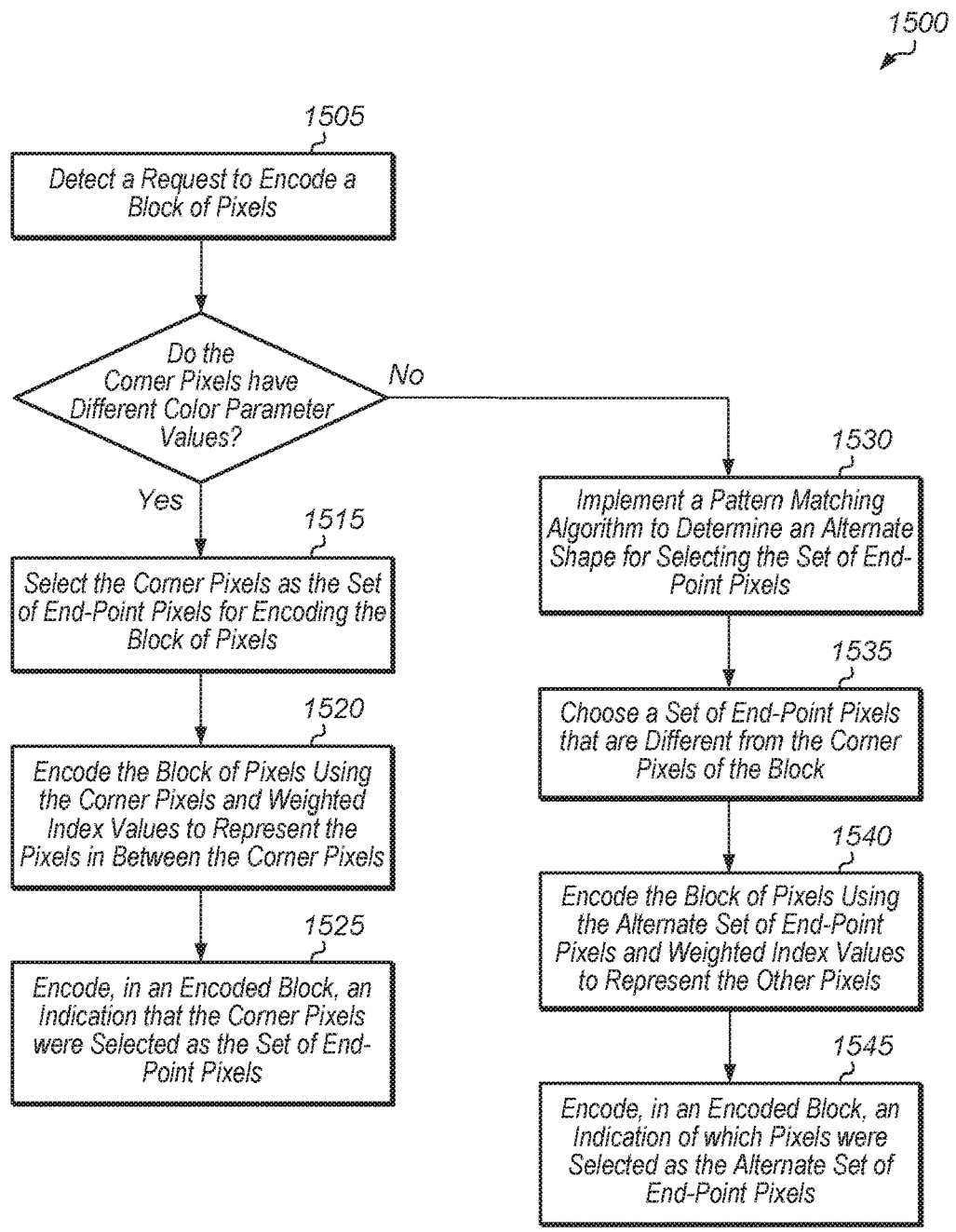
FIG. 15 is a generalized flow diagram illustrating one implementation of a method for selecting a set of end-point pixels.

Turning now to FIG. 12, one implementation of a method 1200 for encoding a sub-frame block of pixels is shown. For purposes of discussion, the steps in this implementation and those of FIG. 13-15 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1200.

An encoder receives a sub-frame block of pixels from a source image or video frame (block 1205). In some implementations, the encoder receives the entire source image or video frame and then partitions the frame into a plurality of sub-frame blocks. In these implementations, the encoder selects a given sub-frame block from the partitioned frame. Next, the encoder selects a set of end-point pixels from the sub-frame block based on one or more criteria (block 1210). In one implementation, the encoder has a fixed number of different possible sets of end-point pixel locations that are able to be selected. These fixed number of different possible sets of end-point pixels correspond to the different modes available to the encoder. In one implementation, the location of the different end-points for the different sets are fixed. In this implementation, the encoder selects from the best set of end-points which has the biggest aggregate color parameter difference between the end-points for the given sub-frame block. In other implementations, other criteria for determining which set of end-point pixels to select from the sub-frame block are possible and are contemplated.

Then, the encoder generates an indication of the selected set of end-point pixels and stores the indication in a compressed block, wherein the compressed block is the compressed version of the original sub-frame block (block 1215). In one implementation, this indication is referred to as an "operator mode", and this indication is stored at the beginning of the compressed block. For example, in one implication, the indication is stored as the first four bits of the compressed block. In other implementations, the indication is other sizes and/or is stored in other locations within the compressed block. The encoder also includes the color parameter values of the selected set of end-point pixels in the compressed block (block 1220). In one implementation, the color parameter values which are stored in the compressed block for the selected set of end-point pixels are unchanged from the original pixel values. In other words, the color parameter values stored in the compressed block are the exact same color parameter values of the original pixels from the uncompressed sub-frame block. In another implementation, the color parameter values which are stored in the compressed block for the selected set of end-point pixels are truncated or otherwise modified to reduce the number of bits used to store the values. The encoder drops the other pixels of the sub-frame block from the compressed block (block 1225). In other words, the encoder does not include the pixels from the sub-frame block which were not selected (i.e., which were not included within the selected set of end-point pixels) in the compressed block.

Also, the encoder generates and includes encoding vectors in the compressed block, wherein the encoding vectors specify weighted values to apply to differences between color parameter values of the set of end-point pixels (block 1230). The weighted values (i.e., indexes) of the encoding vectors are used by the decoder to regenerate the missing (i.e., dropped) pixels by applying the weighted indexes to the differences between color parameter values of the set of end-point pixels. In one implementation, the compressed block is a fixed size (e.g., 128 bits). In other implementations, the size of the compressed block is variable. After block 1230, the encoder generates an indication that the compressed block is ready (block 1235). In one implementation, the encoder writing the compressed block to a memory location is the action which constitutes the indication referred to in block 1235. In another implementation, the indication is generated by the encoder sending the compressed block to a separate module (e.g., network controller, decoder). In a further implementation, the encoder starting to process the next sub-frame block constitutes the indication referred to in block 1235. In other implementations, the encoder generates other types of indications or takes other types of actions to complete processing of the sub-frame block. After block 1235, method 1200 ends. It is noted that method 1200 is repeated for each sub-frame block of an image or video frame that is being encoded.

Referring now to FIG. 13, one implementation of a method 1300 for decoding an encoded sub-frame block of pixels is shown. A decoder receives or accesses an encoded sub-frame block of pixels (block 1305). Next, the decoder extracts the mode value and operator type value from the encoded sub-frame (block 1310). It is assumed for the purposes of this implementation that the operator type value is equal to 0. For other operator type values, the steps of method 1300 are adjusted according to the specific operator type value.

Also, the decoder retrieves the base colors and the encoding sets from the encoded sub-frame block (block 1315). For example, in one implementation, the base colors include the four corner pixels of the original sub-frame block. Also, in one implementation, the encoding sets include four separate values for determining how to generate the missing pixel values of the original sub-frame block. It is noted that "encoding sets" are also referred to as "encoding vectors" herein. Next, the decoder performs weighted linear interpolation calculations and maps the results to generate the missing pixel values (block 1320). Then, the decoder reconstructs the original sub-frame block using the base colors from the end-point pixels and the generated missing pixel values (block 1325). After block 1325, method 1300 ends. It is noted that method 1300 is performed for each sub-frame block of a given image or video frame.

Turning now to FIG. 14, one implementation of a method 1400 for encoding a block of pixels is shown. An encoder detects a request to encode a block of pixels (block 1405). The size of the block of pixels varies from implementation to implementation. In response to detecting the request, the encoder selects multiple pairs of existing pixels from the block of pixels (block 1410). It is noted that the pairs of existing pixels which are selected are also referred to herein as a "set of end-point pixels". Next, the encoder calculates weighted linear interpolation points between each selected pair of existing pixels (block 1415). The weighted linear interpolation points are also referred to herein as "encoding vectors". Then, the encoder encodes the multiple pairs of existing pixels and weighted linear interpolation points in an encoded block (block 1420). In some implementations, the encoder also encodes a mode indication in the encoded block. The mode indication specifies which pairs of existing pixels were selected. After block 1420, method 1400 ends.

Referring now to FIG. 15, one implementation of a method 1500 for selecting a set of end-point pixels is shown. An encoder detects a request to encode a block of pixels (block 1505). The size of the block of pixels varies from implementation to implementation. In response to detecting the request, the encoder determines if the corner pixels of the block have different color parameter values (conditional block 1510). In another implementation, the encoder determines if the aggregate color parameter value difference between the corner pixels of the block is greater than a threshold in conditional block 1510. For the RGB color space, the aggregate color parameter value difference refers to the absolute value of the difference between the red color parameter values added to the absolute value of the difference between the green color parameter values added to the absolute value of the difference between the blue color parameter values.

If the corner pixels of the block have different color parameter values (conditional block 1510, "yes" leg), then the encoder selects the corner pixels as the set of end-point pixels for encoding the block of pixels (block 1515). Next, the encoder encodes the block of pixels using the corner pixels and weighted index values to represent the pixels in between the corner pixels (block 1520). The encoder also encodes, in an encoded block, an indication that the corner pixels were selected as the set of end-point pixels (block 1525). In one implementation, when the encoder selects the corner pixels as the set of end-point pixels, this is referred to as mode 0. After block 1525, method 1500 ends.

If the corner pixels of the block have the same color parameter values (conditional block 1510, "no" leg), then the encoder implements a pattern matching algorithm to determine an alternate (i.e., the next best) shape for selecting the set of end-point pixels (block 1530). Next, the encoder chooses a set of end-point pixels that are different from the corner pixels of the block (block 1535). Then, the encoder encodes the block of pixels using the alternate set of end-point pixels and weighted index values to represent the other pixels (block 1540). The encoder also encodes, in an encoded block, an indication of which pixels were selected as the alternate set of end-point pixels (block 1545). After block 1545, method 1500 ends.

Figure 16:
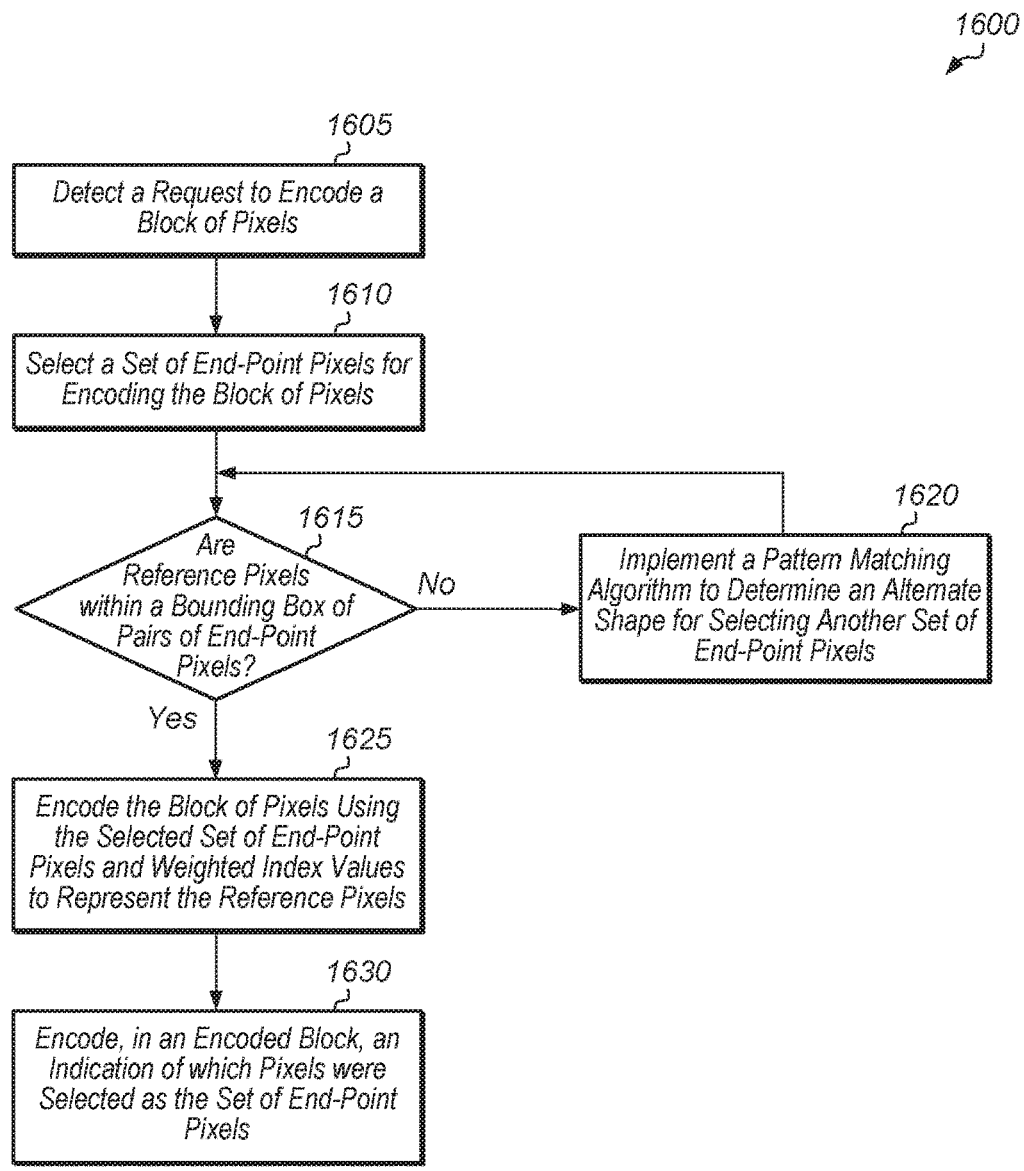
FIG. 16 is a generalized flow diagram illustrating one implementation of a method for encoding a block of pixels.

Turning now to FIG. 16, one implementation of a method 1600 for encoding a block of pixels is shown. An encoder detects a request to encode a block of pixels (block 1605). The encoder selects a set of end-point pixels for encoding the block of pixels (block 1610). The encoder uses any of various techniques for determining which set of end-point pixels to select, with the technique varying from implementation to implementation. If the reference pixels are within a bounding box of corresponding pairs of end-point pixels (conditional block 1615, "yes" leg), then the encoder encodes the block of pixels using original pixel component values of the selected set of end-point pixels and weighted index values to represent the reference pixels (block 1625). In another implementation, the encoder determines if the reference pixels are within a threshold distance from the corresponding end-point pixels in conditional block 1615. The term "reference pixels" refers to the pixels which are being encoded using the encoding vectors. In other words, "reference pixels" are the other pixels which are not selected as the set of end-point pixels. It is noted that other conditions are used in other implementations to determine if the selected set of end-point pixels should be used for encoding the block of pixels. The encoder also encodes, in an encoded block, an indication of which pixels were selected as the set of end-point pixels (block 1630). After block 1630, method 1600 ends. If the reference pixels are not within a bounding box of corresponding pairs of end-point pixels (conditional block 1615, "no" leg), then the encoder implements a pattern matching algorithm to determine an alternate shape for selecting another set of end-point pixels (block 1620). After block 1620, method 1600 returns to conditional block 1615.

Figure 17:
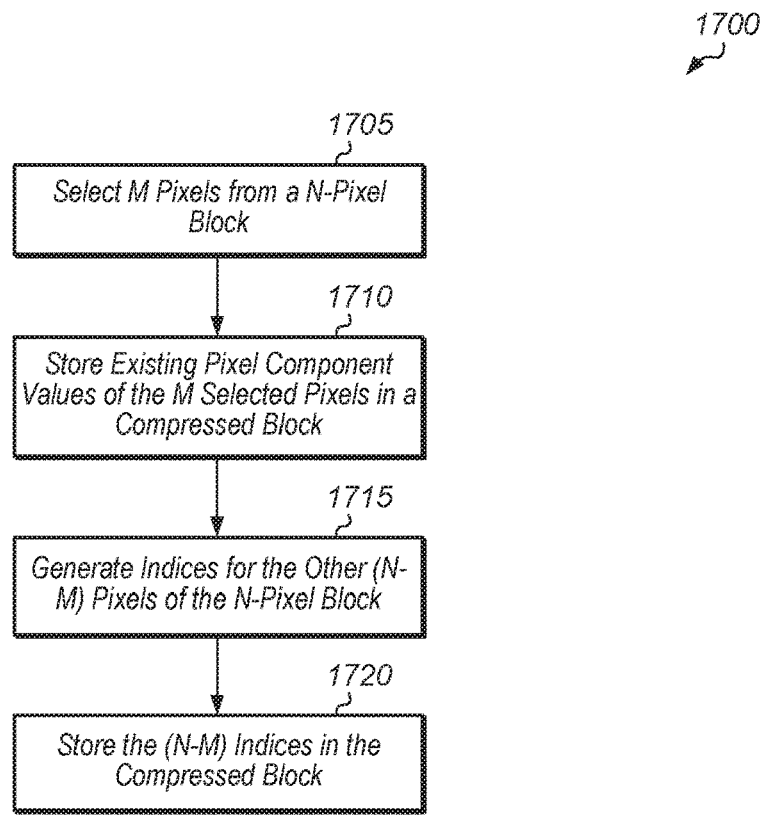
FIG. 17 is a generalized flow diagram illustrating one implementation of a method for encoding a block of pixels.

Referring now to FIG. 17, one implementation of a method 1700 for encoding a block of pixels is shown. An encoder selects M pixels from a N-pixel block (block 1705). It is assumed for the purposes of this discussion that M and N are positive integers. The values of M and N vary from implementation to implementation. In one implementation, N is 16 and M is 4. Depending on the implementation, the encoder utilizes any of various different types of techniques for determining which M pixels to select from the N-pixel block. Next, the encoder stores existing pixel component values of the M selected pixels in a compressed block (block 1710). The pixel component values include one or more of color component values, brightness values, transparency values, density values, or other image data values. Depending on the implementation, the pixel component values are in a RGB color space, YUV color space, or another format. In some implementations, the encoder truncates the existing pixel component values by dropping one or more bits from these values.

Also, the encoder generates indices for the other (N-M) pixels of the N-pixel block (block 1715). In other words, for the other (N-M) pixels of the N-pixel block which were not selected in block 1705, the encoder generates an index for each pixel. In one implementation, each index maps to a linear interpolation function (i.e., an element of a linear interpolation array). Then, the encoder stores the (N-M) indices in the compressed block (block 1720). It is noted that in some implementations, the encoder also stores metadata (e.g., an indication of which M pixels were selected) in the compressed block. After block 1720, method 1700 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
an encoder coupled to a memory, wherein the encoder comprises circuitry configured to:
receive an uncompressed sub-frame block comprising a plurality of N pixels, wherein N is a positive integer;
select M pixels from the uncompressed sub-frame block based on one or more criteria, wherein M is a positive integer less than N;
store original, uncompressed, pixel component values of the M selected pixels as received in the uncompressed sub-frame block in a compressed block, wherein the compressed block represents an encoded version of the sub-frame block;
generate indices for (N-M) other pixels of the sub-frame block;
store indices for the (N-M) other pixels in the compressed block; and
generate an indication that the compressed block is ready.

2. The system as recited in claim 1, wherein the one or more criteria for selecting the M pixels comprise selecting pixels which have a greatest aggregate color parameter difference between pairs of pixels.

3. The system as recited in claim 1, wherein the one or more criteria for selecting the M pixels are determined based on a mode type of the encoder, and wherein responsive to the encoder being in a first mode, the encoder is configured to select corner pixels of the sub-frame block as the M pixels.

4. The system as recited in claim 1, wherein the circuitry is further configured to:

generate an indication of the M pixels which were selected; and store the indication in the compressed block.

5. The system as recited in claim 1, wherein the circuitry is further configured to drop, from the compressed block, the (N-M) other pixels which are not selected as the M pixels, and wherein the indices are used to represent only dropped pixels which are not selected as the M pixels.

6. The system as recited in claim 1, wherein a size of the sub-frame block is 4×4 pixels, and wherein the M pixels include 4 original pixels from the sub-frame block.

7. The system as recited in claim 1, wherein responsive to corner pixels of the sub-frame block having different color parameter values, the encoder is configured to select the corner pixels as the M pixels.

8. A method comprising:
receiving an uncompressed sub-frame block comprising a plurality of N pixels, wherein N is a positive integer;
selecting M pixels from the uncompressed sub-frame block based on one or more criteria, wherein M is a positive integer less than N;
storing original, uncompressed, pixel component values of the M selected pixels as received in the uncompressed sub-frame block in a compressed block, wherein the compressed block represents an encoded version of the sub-frame block;
generating indices for (N-M) other pixels of the sub-frame block;
storing indices for the (N-M) other pixels in the compressed block; and
generating an indication that the compressed block is ready.

9. The method as recited in claim 8, wherein the one or more criteria for selecting the M pixels comprise selecting pixels which have a greatest aggregate color parameter difference between pairs of pixels.

10. The method as recited in claim 8, wherein the one or more criteria for selecting the M pixels are determined based on a mode type of the encoder, and wherein responsive to the encoder being in a first mode, the encoder is configured to select corner pixels of the sub-frame block as the set of end-point pixels.

11. The method as recited in claim 8, further comprising:
generating an indication of the M pixels which were selected; and
storing the indication in the compressed block.

12. The method as recited in claim 8, further comprising dropping, from the compressed block, the (N-M) other pixels which are not selected as the M pixels, wherein the indices are used to represent only dropped pixels which are not selected as the M pixels.

13. The method as recited in claim 8, wherein a size of the sub-frame block is 4×4 pixels, and wherein the M pixels include 4 original pixels from the sub-frame block.

14. The method as recited in claim 8, wherein responsive to corner pixels of the sub-frame block having different color parameter values, the method further comprising selecting the corner pixels as the M pixels.

15. An apparatus comprising:
a memory; and
a processor coupled to the memory;
wherein the processor is configured to:
receive an uncompressed sub-frame block comprising a plurality of N pixels, wherein N is a positive integer;
select M pixels from the uncompressed sub-frame block based on one or more criteria, wherein M is a positive integer less than N;
store original, uncompressed, pixel component values of the M selected pixels as received in the uncompressed sub-frame block in a compressed block, wherein the compressed block represents an encoded version of the sub-frame block;
generate indices for (N-M) other pixels of sub-frame block;
store indices for the (N-M) other pixels in the compressed block; and
generate an indication that the compressed block is ready.

16. The apparatus as recited in claim 15, wherein the one or more criteria for selecting the M pixels comprise selecting pixels which have a greatest aggregate color parameter difference between pairs of pixels.

17. The apparatus as recited in claim 15, wherein the one or more criteria for selecting the M pixels are determined based on a mode type of the encoder, and wherein responsive to the encoder being in a first mode, the encoder is configured to select corner pixels of the sub-frame block as the M pixels.

18. The apparatus as recited in claim 15, wherein the processor is further configured to:
generate an indication of the M pixels which were selected; and
store the indication in the compressed block.

19. The apparatus as recited in claim 15, wherein the processor is further configured to drop, from the compressed block, the (N-M) other pixels which are not selected as the M pixels, and wherein the indices are used to represent only dropped pixels which are not selected as the M pixels.

20. The apparatus as recited in claim 15, wherein a size of the sub-frame block is 4×4 pixels, and wherein the M pixels include 4 original pixels from the sub-frame block.

* * * * *